US012725246B2

(12) United States Patent
Flanagan et al.

(10) Patent No.: US 12,725,246 B2
(45) Date of Patent: Sep. 1, 2026

(54) DEVICE LINE UNDERSTANDING USING COMPOSED TEMPLATES

(71) Applicant: FEI Company, Hillsboro, OR (US)

(72) Inventors: John Flanagan, Hillsboro, OR (US); Hayley Johanesen, Portland, OR (US); Lucas Paul Winiarski, Portland, OR (US); Christopher Hakala, Hillsboro, OR (US)

(73) Assignee: FEI Company, Hillsboro, OR (US)

( * ) Notice: Subject to any disclaimer, the term of this patent is extended or adjusted under 35 U.S.C. 154(b) by 504 days.

(21) Appl. No.: 18/341,685

(22) Filed: Jun. 26, 2023

(65) Prior Publication Data

US 2024/0428400 A1 Dec. 26, 2024

(51) Int. Cl.

| | |
|---|---|
| ***G06T 7/00*** | (2017.01) |
| ***G06T 7/66*** | (2017.01) |
| ***G06T 7/73*** | (2017.01) |
| ***G06V 10/75*** | (2022.01) |
| ***G06V 20/69*** | (2022.01) |

(52) U.S. Cl.

CPC ................ *G06T 7/001* (2013.01); *G06T 7/66* (2017.01); *G06T 7/74* (2017.01); *G06V 10/751* (2022.01); *G06V 20/698* (2022.01); *G06T 2207/10056* (2013.01); *G06T 2207/20084* (2013.01); *G06T 2207/30148* (2013.01)

(58) Field of Classification Search

CPC .. G06T 7/001; G06T 7/74; G06T 7/66; G06T 2207/10056; G06T 2207/20084; G06T 2207/30148; G06V 20/698; G06V 10/751

See application file for complete search history.

(56) References Cited

U.S. PATENT DOCUMENTS

2021/0088770 A1* 3/2021 Flanagan et al. ...... G02B 21/36
2025/0166166 A1* 5/2025 Jin et al. .................. G06T 7/00

FOREIGN PATENT DOCUMENTS

DE 3866113 A1 * 8/2021 ............... G06T 7/70

* cited by examiner

*Primary Examiner* — Vu Le
*Assistant Examiner* — Matthew James Bodnark
(74) *Attorney, Agent, or Firm* — Leron Vandsburger

(57) ABSTRACT

Systems, components, methods, and algorithms for generating template information are described. a computer-implemented method includes receiving microscope image data, detecting a feature in the microscope image data, receiving feature template data describing a grouping of features including the feature, detecting the grouping in the microscope image data based at least in part on the feature template data, generating template information describing the grouping, and outputting the template information.

20 Claims, 6 Drawing Sheets

DEVICE LINE UNDERSTANDING USING COMPOSED TEMPLATES

TECHNICAL FIELD

Embodiments of the present disclosure are directed to charged particle microscope systems, as well as algorithms and methods for their operation. In particular, some embodiments are directed toward techniques for system automation.

BACKGROUND

Semiconductor manufacturing makes use of charged particle microscopy, such as transmission electron microscopy, as part of quality control. In an illustrative example, samples of semiconductor devices (e.g., integrated circuits) are extracted from a wafer or wafer portion (e.g., a diced wafer) and examined in a transmission electron microscope. Microscope images of a so-called "device line." referring to a linear arrangement of individual devices, such as transistors, capacitors, or the like, can be used to assess fabrication error and/or design error. One aspect of quality control of semiconductor devices, therefore, includes determining whether a fabricated device conforms to the device design, with individual devices being present in the expected number and sequence at a given location on the wafer and/or wafer portion.

Typically, quality control of semiconductors is at least partially, if not entirely, manual. Sample preparation, including locating and extracting lamellae, generating microscope image data, and analyzing image data to determine whether the fabricated device conforms to device designs, among other operations, are executed by skilled technicians. Efforts to automate aspects of quality control processes face significant challenges, including image processing automation. Defect detection, for example, relies on correctly identifying regions of interest in a sample, generating images of the region of interest, and processing images via feature detection and recognition, pattern matching, and the like. Each of these operations are challenging for machine-vision systems that typically perform poorly when distinguishing IC devices from background, are prone to errors when a sample is inverted in the microscope, and/or are relatively inflexible when analyzing a device line sample that diverges from a pre-defined sequence. There is a need, therefore, for improved data processing techniques, methods, and/or algorithms for use in quality control of semiconductor fabrication.

BRIEF SUMMARY

In an aspect, a computer-implemented method includes receiving microscope image data, detecting a feature in the microscope image data, receiving feature template data describing a grouping of features including the feature, detecting the grouping in the microscope image data based at least in part on the feature template data, generating template information describing the grouping, and outputting the template information.

Detecting the feature in the microscope image data can include inputting at least a portion of the microscope image data to a model configured to detect the feature and generating, as an output of the model, coordinate information describing a location of the feature in the microscope image data. The location of the feature can correspond to a set of coordinates for a centroid of the feature. The model can include a convolutional neural network trained to input the portion of the microscope image data and to output the coordinate information. The feature can be a first feature, the model can be a first model, the portion can be a first portion, the coordinate information can be first coordinate information, and the location can be a first location. The microscope image data can include a second feature. The method can further include inputting at least a second portion of the microscope image data to a second model configured to detect the second feature and generating, as an output of the second model, second coordinate information describing a second location of the second feature in the microscope image data.

The feature template data can describe a sequence of multiple features including the first feature. Detecting the grouping can include convolving the feature template data with the coordinate information and detecting an instance of the grouping in the microscope image data based at least in part on the location of the feature relative to at least a subset of the multiple features in the sequence. Detecting the instance of the grouping can include determining a first rank of the first feature in the sequence and determining that the first rank of the first feature and a second rank of a second feature in the sequence match the feature template data.

The feature template data can include feature multiplicity information and feature order information. Detecting the grouping in the image data can include detecting an instance of the grouping having an inverse feature order. The feature can form at least part of a device in an integrated circuit. The microscope image data can include an image generated by a charged particle microscope. The microscope image data can further include coordinate metadata mapping a pixel of the image data to a position on a sample.

Outputting the template information can include sending the template information to a charged particle microscope, the charged particle microscope being configured to generate image data based at least in part on the template information. The template information can include a location of the grouping in the microscope image data. The location of the grouping can correspond to a vertex of a bounding box circumscribing the grouping.

In an aspect, one or more non-transitory machine-readable media, storing instructions that, when executed by a machine, cause the machine to perform operations of the methods of the preceding aspect.

In an aspect, a system includes an analytical instrument, configured to generate image data, and a computing device, operably coupled with the analytical instrument and configured to receive the image data from the analytical instrument. The computing device can be configured to include the media and/or to perform operations of the methods of the preceding aspects. The analytical instrument can be or include a charged particle microscope. The computing device can be an instrument PC, a client computing device, or one or more servers. The computing device can be configured to receive the image data from the analytical instrument via one or more networks.

Embodiments of the present disclosure also include systems, components, and methods in accordance with the preceding aspects. The terms and expressions which have been employed are used as terms of description and not of limitation, and there is no intention in the use of such terms and expressions of excluding any equivalents of the features shown and described or portions thereof, but it is recognized that various modifications are possible within the scope of the claimed subject matter. Thus, it should be understood that although the present claimed subject matter has been specifically disclosed by embodiments and optional features, modification and variation of the concepts herein disclosed can be resorted to by those skilled in the art, and that such modifications and variations are considered to be within the scope of this disclosure as defined by the appended claims.

BRIEF DESCRIPTION OF THE SEVERAL VIEWS OF THE DRAWINGS

The foregoing aspects and many of the attendant advantages of the present disclosure will become more readily appreciated as the same become better understood by reference to the following detailed description, when taken in conjunction with the accompanying drawings.

Figure 1:
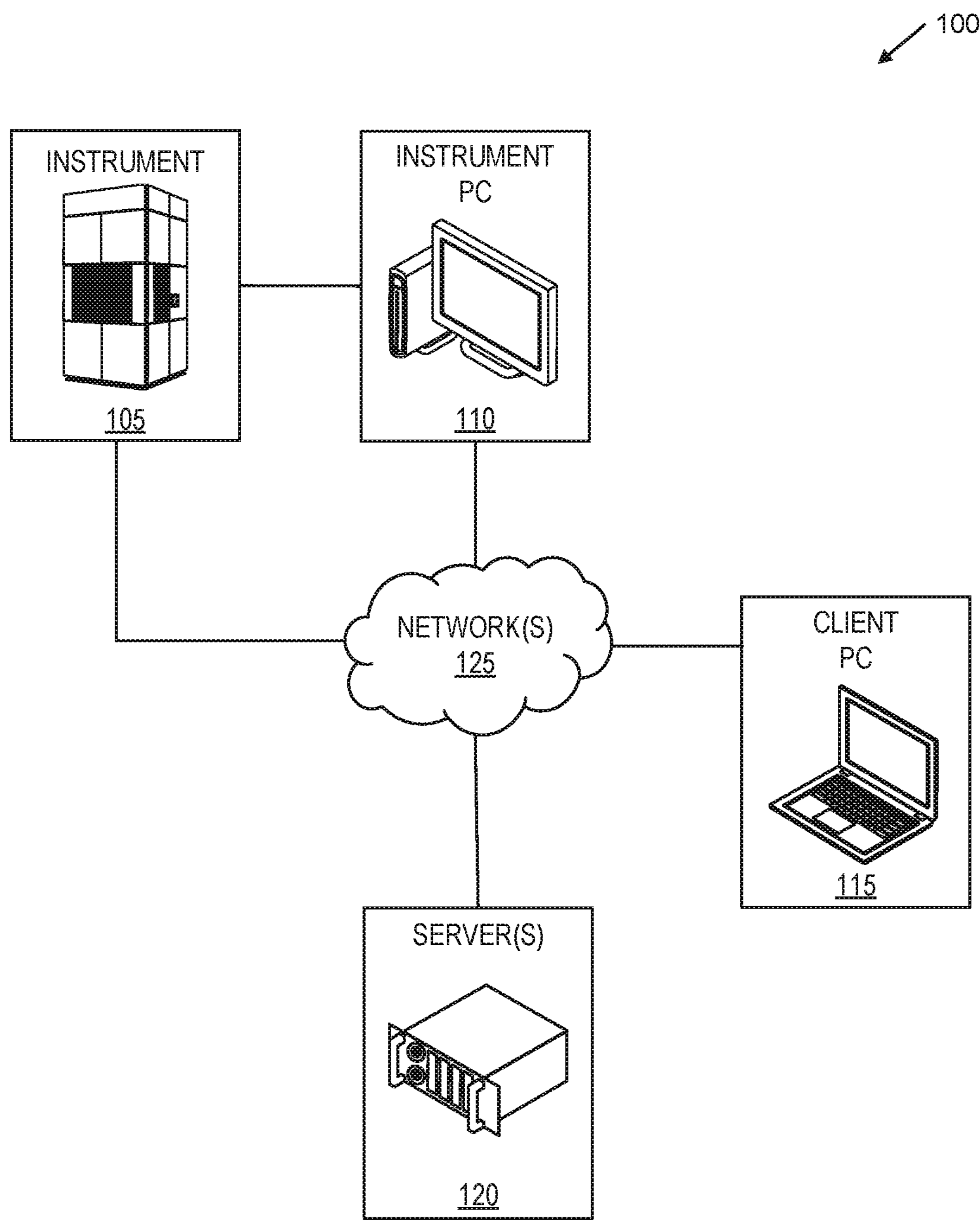
FIG. 1 is a schematic diagram illustrating an example charged particle microscope system, in accordance with some embodiments of the present disclosure.

In the drawings, like reference numerals refer to like parts throughout the various views unless otherwise specified. Not all instances of an element are necessarily labeled to reduce clutter in the drawings where appropriate. The drawings are not necessarily to scale, emphasis instead being placed upon illustrating the principles being described.

DETAILED DESCRIPTION

While illustrative embodiments have been illustrated and described, it will be appreciated that various changes can be made therein without departing from the spirit and scope of the disclosure. In the forthcoming paragraphs, embodiments of a charged particle microscope system, components, and methods for device detection and recognition in integrated circuit samples are described. Embodiments of the present disclosure focus on CMOS device samples imaged in a transmission electron microscope (TEM) in the interest of simplicity of description. To that end, embodiments are not limited to such samples or instruments, but rather are contemplated for analytical instrument systems where analysis of micro-structured and/or nanostructured features can benefit from robust automation (e.g., operation without human intervention) and/or pseudo-automation (e.g., operation with limited human intervention). In an illustrative example, techniques of the present disclosure can be applied to image data derived from microbiological processes (e.g., genetic sequencing outputs, fluorescence microscope images, etc.), metastructured materials (e.g., for quality control of fabricated hidden geometries), and/or for large-scale imaging of artificial or natural structures (e.g., survey data, such as hyperspectral imaging). Similarly, while embodiments of the present disclosure focus on TEMs, additional and/or alternative systems are contemplated, including but not limited to scanning electron microscopes (SEM), scanning-transmission electron microscopes (STEM), STEM-in-SEM, atomic-force microscopy (AFM), scanning capacitance microscopy (SCM), ion microscopy (IM), optical microscopy, confocal microscopy, fluorescence microscopy, hyperspectral imaging, or the like, where instruments are used to generate image data representing structures or other features that at least partially conform to a pattern.

Embodiments of the present disclosure include systems, methods, algorithms, and non-transitory media storing computer-readable instructions for generating template information from image data. In an illustrative example, a method can include receiving microscope image data, detecting a feature in the microscope image data, receiving feature template data describing a grouping of features including the feature, detecting the grouping in the microscope image data based at least in part on the feature template data, generating template information for the grouping, and outputting the template information. As described in reference to the forthcoming embodiments, the hierarchical structure of template data permits systems of the present disclosure to efficiently process microscope image data, to detect features in arrangements corresponding to a design or other characteristic pattern, to determine regions of interest in a semiconductor sample for imaging, and to direct the systems to generate image data including the regions of interest. In this way, analytical instrument systems can perform template-driven image generation with reduced human interaction, with improved performance in terms of time and computational resource demand, while also reducing the level of technical complexity demanded of human operators of the instrument systems.

FIG. 1 is a schematic diagram illustrating an example charged particle microscope system 100, in accordance with some embodiments of the present disclosure. The example system 100 can include one or more instrument systems 105, one or more instrument PCs (IPCs) 110, one or more client computing devices (client PCs) 115, and/or one or more servers 120. The various components of the example system 100 can communicate via one or more networks 125 and/or via a direct connection (e.g., a USB-type connection, Bluetooth, WiFi, ethernet, etc.). In some embodiments, one or more components of example system 100 are omitted. For example, embodiments of the present disclosure can omit the client PC(s) 115, and/or the server(s) 120.

The instrument system(s) 105 can include components for analyzing material samples according to one or more measurement modalities, facilitated by the configurations of the instrument(s) 105 and software, tools, or the like, available on the IPC(s) 110, the client PC(s) 115, and/or server(s) 120. For example, the client PC(s) 115 and/or server(s) 120 can host software applications configured to implement one or more processing operations using data generated by the instrument(s) 105. In this way, software applications can be hosted locally on individual devices and/or on distributed computing systems and operations of the instrument 105 can be directed based at least in part on template information generated from image data generated by the instrument 105.

The client computing device(s) 115 can be or include general purpose (e.g., laptops, tablets, smart phones, desktops, etc.) and/or special purpose computing devices. The server(s) 120 can be or include one or more local and/or remote network connected machines including processing, storage, and/or communication components. In an illustrative example, the server(s) 120 can be co-located with the instrument(s) 105 in a physical location (e.g., a building, campus, or other location), and can communicate with one or more components of the instrument(s) 105. The client PC(s) 115 can be located at a first physical location different from a second physical location of the instrument(s) 105. To that end, constituent elements of the example system 100 can be co-located to store large datasets generated by the instrument system(s) 105 and to reduce data transfer latency during periods of relatively high network latency, or, for example, when the first physical location and the second physical location are physically remote (e.g., on different continents or different coasts of the same continent).

IPC(s) 110 can include general purpose or special purpose computing devices. For example, embodiments include a PC configured for user interaction (e.g., having display, user interaction peripherals, and user interface), a PC dedicated to coordinating the operation of the instrument(s) 105 without direct user interaction (also referred to as a "dedicated" PC) that lacks user interface components, and/or a compute board incorporated into or otherwise operably coupled with the instrument(s) 105. A compute board can include components similar to the dedicated PC, where power circuitry and/or input output components can be shared with the instrument(s) 105.

Figure 2:
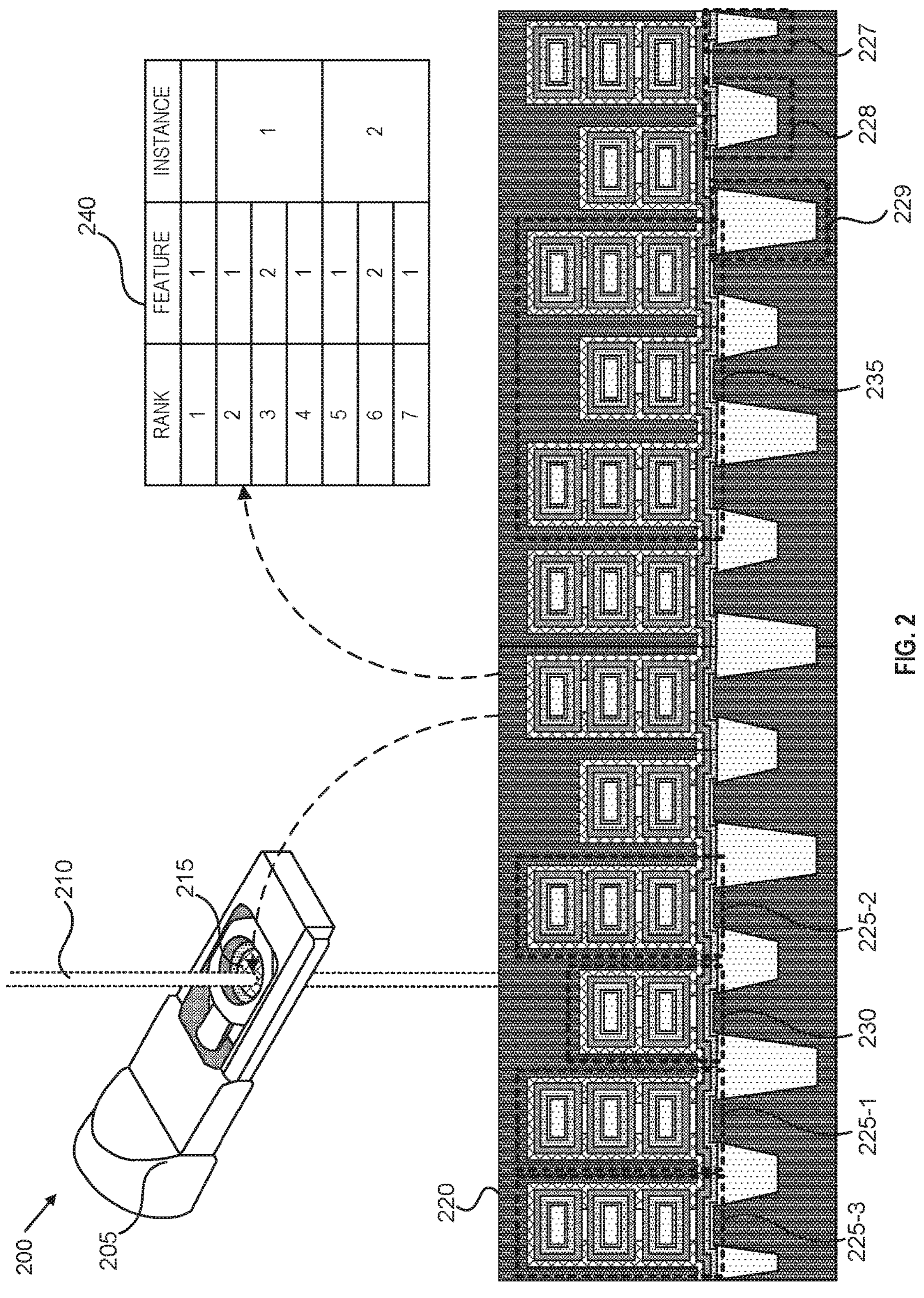
FIG. 2 is a schematic diagram illustrating an example analytical system for generating microscope image data and template information, in accordance with some embodiments of the present disclosure.

FIG. 2 is a schematic diagram illustrating an example analytical system 200 for generating microscope image data 220 and template information 240, in accordance with some embodiments of the present disclosure. In the illustrated embodiment, the example analytical system 200 includes a TEM sample 205, as an example of a form of sample used in the instrument 105 of example system 100. In this way, microscope image data 220 include microscope image(s) formed by passing a beam of charged particles 210 through a sample 215 that is at least partially transparent to electrons.

The example analytical system 200 of FIG. 2 illustrates a TEM sample, such that the beam of charged particles 210 is a beam of electrons. In some embodiments, the beam of charged particles 210 is or includes a beam of ions (e.g., extracted from an ion source such as a liquid metal ion source, a plasma-based ion source, or the like). Further, the beam of charged particles 210 is shown transiting through the sample 215, such that image data 220 corresponds to an image constructed with detector data generated from primary charged particles of the beam of charged particles 210 (e.g., primary electrons in the case of TEM system(s)). In some embodiments, the beam of charged particles 210 is focused onto the sample 215, such that the image data 220 can include backscattered electron, backscattered ion, secondary electron, and/or secondary ion detector data. In such cases, the sample 215 can be mostly or entirely opaque to charged particles, such as a bulk material sample or a sample having a thickness such that electron absorption and/or backscatter outweigh electron transmission.

Image data 220 illustrate a region of the sample 215 that includes features 225 and 230, disposed in an arrangement. The arrangement can be a linear arrangement and/or a non-linear arrangement. In the example of a semiconductor device, the features 225 and 230 can be arranged in a "device line," which includes multiple instances of features 225 and 230 that are formed during a CMOS fabrication process. Features 225 and 230 can be or include at least part of various devices that make up a part of an integrated circuit, such as transistors, capacitors, vias, or the like. In some cases, the same device can be detected as more than one feature type, based at least in part on variation of a characteristic of the device. For example, size can be used to categorize a device into one of a set of feature types (e.g., small-type 227, middle-type 228, and large-type 229). Similarly, other characteristics, such as material composition, sub-features, etc., can be used (e.g., in one or more preprocessing operations) to define multiple feature-types.

The image data 220 can include metadata, including but not limited to sample information, system parameters, and/or spatial/coordinate information. Spatial/coordinate metadata can map a pixel in the image data 220 to a set of coordinates of a position on the sample 205. In some cases, the coordinates can reference a stage control scheme, such as a multi-axis sample holder (e.g., three spatial directions and tilt). In this way, features 225 and 230 can be referenced by a position on the sample 205 and in the image data 220. For example, a feature can be referenced by a position of a centroid of the feature in the image data 220 and/or on the sample 205. The extents, centroid, and other geometric characteristics of various features can be determined based at least in part on segmentation processes applied to the image data 220. Additionally and/or alternatively, dimensions, extents, and/or centroids of the various features can be determined based at least in part on detection of one or more edges, vertices, or other aspects of the features, from which a pre-defined centroid can be referenced. For example, a vertex between a top edge and a side edge of a given feature can be referenced to define a centroid, based on a design specification of the given feature. As described in more detail in reference to FIG. 3, the position of the centroid can be referenced to a bounding box used to define a region of interest (ROI) for further microscopy and/or microanalysis (e.g., by imaging or probing).

To that end, techniques of the present disclosure can include processes applied to image data 220, from which the observed arrangement of the features 225 and/or 230 can be compared to feature template data (e.g., feature template data 405 of FIGS. 4-5), as an approach to guiding microscopy and microanalysis of the sample 205. The features 225 and 230 illustrated in FIG. 2 are schematic in nature, and do not represent the shape or scale of actual semiconductor devices. Instead, image data 220 is provided as an illustrative example of features arranged in the sample 215, from which the template information 240 can be generated. Further, while the image data 220 includes two types of features, techniques of the present disclosure can be applied to image data describing samples that include more or fewer feature types.

The template information 240 can include data for the features 225 and 230 including a feature sequence, such as a number of instances of a first feature type 225 and a number of instances of a second feature type 230 in a grouping 235. As such, the template information 240 can include a sequence of features (e.g., in order of respective position in an arrangement), where the grouping 235 corresponds to the sequence of features. In the example of FIG. 2, a template corresponds to a sequence of features in a device line, for which the grouping 235 includes a first instance of the first feature 225-1, an instance of the second feature 230, and a second instance of the first feature 225-2. The image data 220 can describe multiple instances of the grouping 235, and not all features 225 and/or 230 can belong to a grouping instance (e.g., third instance of the first feature 225-3). As described in more detail in reference to FIG. 3, the template information 240 can be generated by processing the image data 220 using algorithm(s) for detecting features in the image data 220, recognizing the arrangement of the features in grouping(s) in correlation with feature template data, and generating information describing the position(s) and sequence of the groupings to be used for investigating the structure of a sample.

Figure 3:
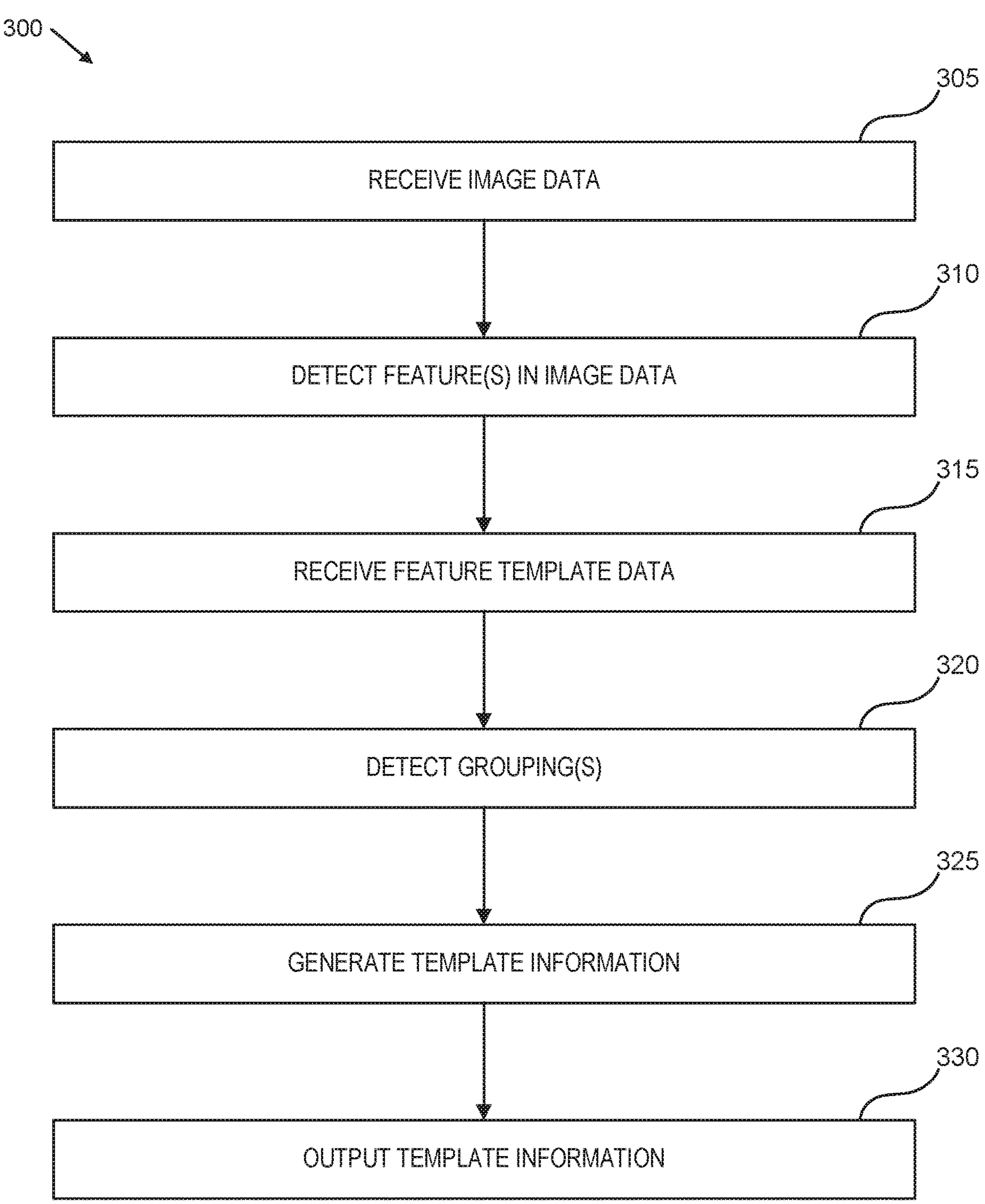
FIG. 3 is block flow diagram of an example process for generating template information using image data, in accordance with some embodiments of the present disclosure.

FIG. 3 is a block flow diagram of an example process 300 for generating template information using image data, in accordance with some embodiments of the present disclosure. One or more operations making up the example process 300 can be executed and/or initiated by a computer system and/or other machine operably coupled with components of an analytical instrument (e.g., example the instrument(s) 105 of FIG. 1) and/or additional systems or subsystems including, but not limited to, characterization systems, network infrastructure, databases, controllers, relays, power supply systems, and/or user interface devices. To that end, operations can be stored as machine executable instructions in one or more machine readable media that, when executed by the computer system, can cause the computer system to perform at least a portion of the constituent operations of the process 300. The constituent operations of the process 300 can be preceded by, interspersed with, and/or followed by operation(s) that are omitted from the present description, such as sample and/or instrument preparation, operations that take place prior to operations 305, or the like, that form at least a part of an analytical method for processing a sample to generate data as illustrated in FIG. 2. To that end, operations of the example process 300 are be omitted, repeated, reordered, and/or replaced in some embodiments.

At operation 305, example process includes receiving image data (e.g., image data 220 of FIG. 2). Receiving image data can include various sub-operations associated with data storage and retrieval. For example, image data can be stored in a local storage system and/or distributed storage system(s), such that a computing device (e.g., IPC 110, client PC 115, server(s) 120, etc. Of FIG. 1) can request, retrieve, or otherwise access image data for a given sample. In some embodiments, receiving image data includes generating the image data, as described in more detail in reference to FIG. 2. To that end, example process 300 can be implemented by one or more computing systems concurrent with imaging a sample in a charged particle microscope, for example, as part of a semiconductor quality control scheme. In an illustrative example, microscope image data (e.g., image data 220 of FIG. 2) can be generated and transferred from the charged particle microscope (e.g., instrument 105 of FIG. 1) to a computing device or other machine that is implementing operations of the example process 300.

At operation 310, example process includes detecting one or more features in the image data. Feature detection can include one or more techniques, based at least in part on image processing and/or segmentation, that permits the detection and/or recognition of features (e.g., features 225 and 230 of FIG. 2) in image data. Detecting the one or more features can include inputting at least a portion of the microscope image data to a model configured to detect the feature, and generating, as an output of the model, coordinate information describing a location of the feature in the microscope image data. As described in more detail in reference to FIGS. 4-5, the model can be or include various model structures configured to input at least a portion of the microscope image data and to output information describing the rank, position, and/or size of a given feature, among other information that can be used for detecting groupings (e.g., grouping 235 of FIG. 2) in the microscope image data. Model structures can include rules-based models, feature detection algorithms (e.g., Sobel filter-based edge detection, Gabor filter-based texture analysis, or the like), neural network-based models (e.g., convolutional neural networks), pixel-based classification methods, patch-based image classification methods, or the like.

In some embodiments, multiple models are used to detect multiple features in the image data. Models can be configured to detect a respective feature type, such that for a given number of features to be detected in the microscope image data, the same number of models are prepared. For example, two convolutional neural network models can be trained as part of preparatory operations for the example process 300, such that a first model detects a first feature type and a second model detects a second feature type. To that end, detecting the one or more features in the image data can include inputting at least a second portion of the microscope image data to a second model configured to detect a second feature and generating, as an output of the second model, second coordinate information describing a second location of the second feature in the microscope image data. In some cases, the complete microscope image dataset is processed, being inputted to multiple models. In some cases, however, operation 310 can include sub-operations, such as segmentation and pre-processing (e.g., feature-agnostic) to separate features into smaller datasets, thereby reducing the volume of data processed by the models. The smaller datasets can be labeled with a grid reference or other index, as an approach to tracking the rank of the feature in a sequence, as described in more detail in reference to FIG. 2 and FIGS. 5-6.

At operation 315, example process includes receiving feature template data. As described in more detail in reference to FIG. 2, and FIGS. 4-6, feature template data (e.g., feature template data 405 of FIG. 4) can describe an arrangement of multiple features (e.g., features 225 and 230 of FIG. 2). For example, feature template data can describe a spatial arrangement of the multiple features, using relative coordinates that can be compared to detected features in microscope image data. In a simpler example, feature template data can describe a sequence of multiple features, where feature(s) are attributed a sequence position (e.g., using integer ranking). In this way, feature template data can describe the expected arrangement of features in a sample (e.g., sample 215 of FIG. 2) to be used as part of microscopy, microanalysis, and/or quality control review of samples, such as integrated circuit samples. Feature template data can include metadata, such as feature type, feature dimensions, relative positions of centroids, or other information that can be used to map the arrangement of features in the microscope image data to a feature template. In some embodiments, feature template data includes feature multiplicity information and feature order information. Feature multiplicity can describe a number of instances of a given feature, while feature order information can describe the relative rank of features in a sequence. In some embodiments, a template can include multiple groupings (e.g., grouping 235 of FIG. 2), as described in more detail in reference to FIG. 4.

At operation 320, example process includes detecting one or more groupings. The groupings (e.g., grouping 235 of FIG. 2) can include multiple instances of features in the microscope image data. For example, a grouping can include one or more instances of a first feature, one or more instances of a second feature, and one or more instances of a third feature, in an arrangement. Detecting the groupings can include one or more approaches using data generated at operation 310. For example, rank data generated by feature detection can be convolved with feature template data, as described in more detail in reference to FIG. 6. Detecting the one or more groupings can include detecting an instance of the grouping in the microscope image data based at least in part on a location of a feature relative to at least a subset of the multiple features in a sequence. In this way, detecting an instance of the grouping in the microscope image data can include determining a first rank of the first feature in a sequence and determining that the first rank of the first feature and a second rank of a second feature in the sequence match the feature template data. For example, detecting a grouping can include finding a matching sequence of features in the arrangement (e.g., a first feature, followed by a second feature, followed by a first feature, as illustrated in FIG. 2 and in FIG. 6, can be identified as a grouping).

Grouping detection can be based at least in part on feature multiplicity and/or feature order, as described in reference to operation 315. For some analytical instrument systems (e.g., TEM systems, STEM systems, or the like), a sample (e.g., sample 215 of FIG. 2) can be introduced into the sample holder in more than one orientation. For example, in a TEM holder, a lamella can define two broad faces, either of which can be oriented toward the incident beam of electrons (e.g., beam of charged particles 210 of FIG. 2). In this way, the feature template data can describe order information that can be directly mapped to the observed features detected in the microscope image data, or mapped to an inverse arrangement (e.g., a mirror-inverse), resulting from the inversion of the sample in the analytical instrument system. As such, operation 320 can include detecting an instance of a grouping based on an inverse feature order. In an example, an inverse feature order of a template having two first features followed by one second feature, in a linear arrangement, would be a sequence of one second feature followed by two first features.

At operation 325, example process includes generating template information. Template information can include metadata derived from the microscope image data, based at least in part on the grouping(s) detected at operation 320. For example, template information derived from a given grouping can include coordinates of the grouping that, without limitation, can include a position of the grouping in the microscope image data and/or in the sample. The position of the grouping can be described using a centroid or other substantially centered position of the grouping, extents of the grouping (e.g., a four-corners set of coordinates, a bounding-box, or the like), a vertex or other peripheral coordinate and/or origin of a bounding box circumscribing the grouping, contour data, or the like. Advantageously, defining a position of a grouping using a centroid or other substantially centered position can permit instructions to be generated for the analytical instrument to cause the instrument to generate new image data, for which the region of interest is centered, substantially centered, or includes the grouping. In this way, the groupings can be detected in microscope image data at relatively low magnification and analyzed in new microscope image data at relatively high magnification in an automated or pseudo-automated approach.

At operation 330, example process includes outputting template information. Operation 330 can include sending the template information to a charged particle microscope, the charged particle microscope being configured to generate image data based at least in part on the template information, as described in reference to operation 325. In some embodiments, operation 330 includes storing template information, which can include transferring the template information between computing devices (e.g., over network(s) 125 of FIG. 1). Operation 330 can also include generating visualization data based at least in part on the template information. Visualization data can include instructions configured to modify a display or other device for presenting the template information as part of a user environment (e.g., a browser or application environment on a display) on a computing device (e.g., IPC 110 and/or client PC 115 of FIG. 1). In an illustrative example, visualization data can be generated to modify a display to overlay a bounding box on a region of the microscope image data, where the bounding box represents the region of interest substantially centered on one or more groupings. In some embodiments, operation 330 includes outputting feature and/or grouping information, such that visualization data can include feature rank, feature identifier, feature centroid, grouping centroid, grouping instance number, and/or template order information, among other types of information. Operation 330, therefore, can include outputting information from multiple hierarchical levels of feature, grouping, and template, that permits a sample to be systematically and efficiently interrogated by an automated and/or pseudo-automated technique.

Figure 4:
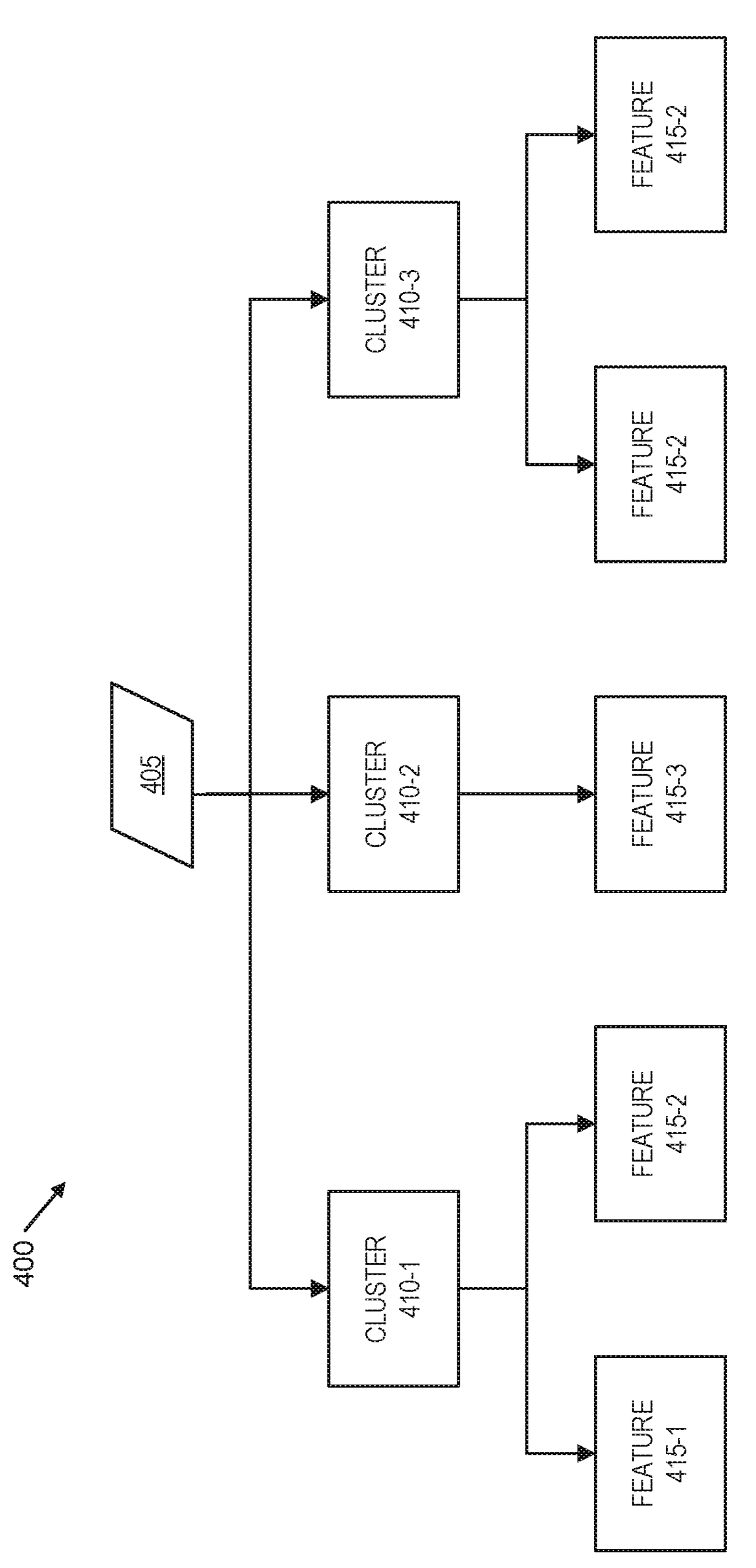
FIG. 4 is a block diagram of an example object hierarchy describing the template information, in accordance with some embodiments of the present disclosure.

FIG. 4 is a block diagram of an example object hierarchy 400 describing the template information, in accordance with some embodiments of the present disclosure. The example hierarchy 400 includes a top-level object associated with feature template data 405, comprising data for multiple clusters 410, in turn comprising one or more features 415. The example hierarchy 400 includes three tiers of objects described in image data (e.g., image data 220 of FIG. 2), but template information can include more or fewer tiers of objects. For example, a grouping (e.g., grouping 235 of FIG. 2) can represent a template or a cluster 410.

The features 415 can be of one or more types, as described in more detail in reference to FIG. 2. As such, each feature 415 type can be associated with a model configured to detect the feature 415 type in image data. The models can generate metadata used to detect the cluster(s) 410 and/or the template(s) 405 in the image data, as described in more detail in reference to FIG. 3 and FIGS. 5-6. Similarly, clusters 410 can represent a combination of features and/or compound features that are described in a device design, expected arrangement, or the like, such that detecting a cluster 410 can be computationally simpler than detecting the constituent features 415. In an illustrative example, a device line can include clustered contiguous features, making an outer boundary of the cluster suitable for detecting the cluster, in addition to or instead of detecting individual features making up the cluster. As such, one or more models can be configured to detect cluster(s) 410 in the image data.

Figure 5:
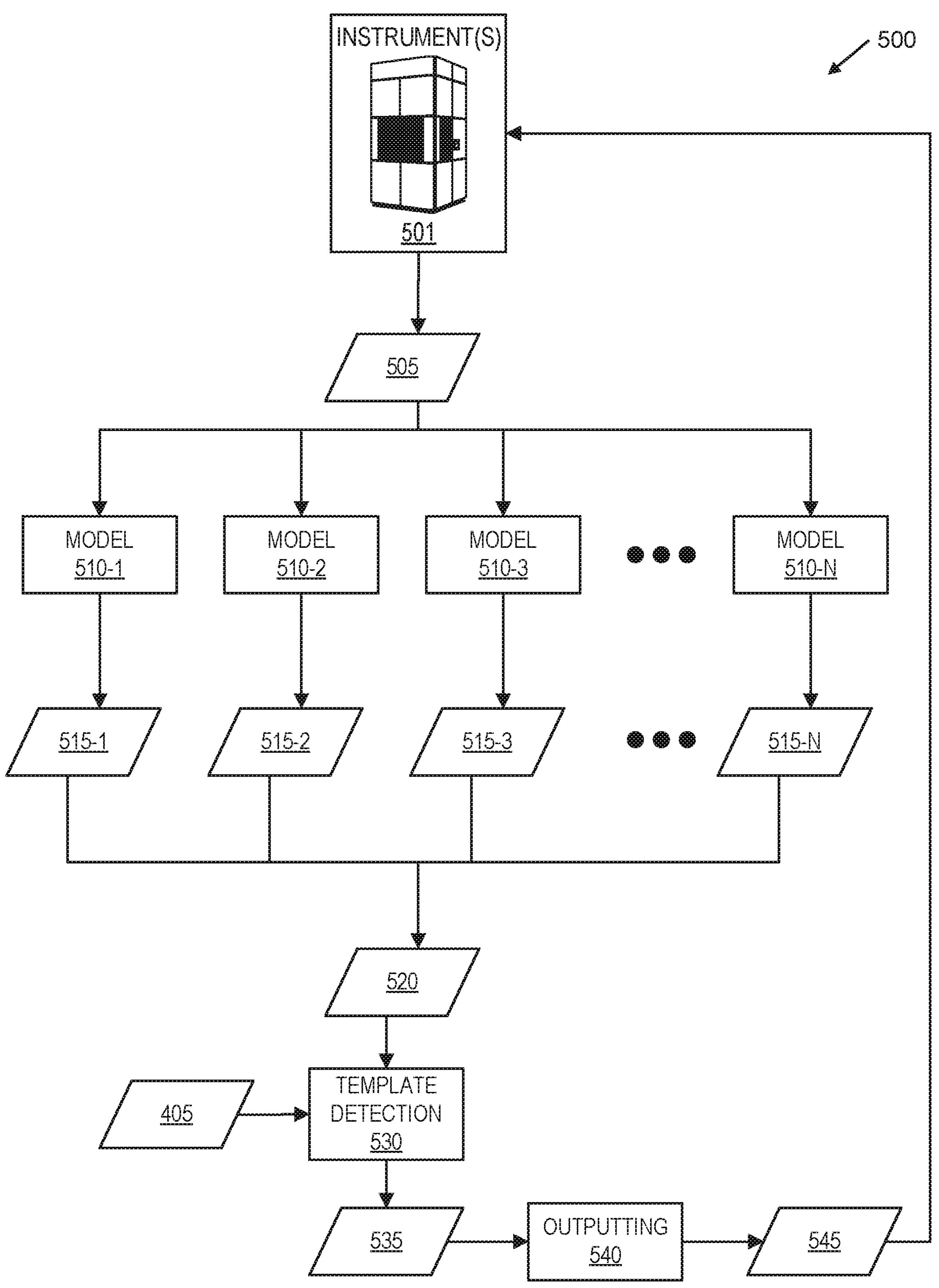
FIG. 5 is a block flow diagram illustrating an example data flow involved in generating the template information, in accordance with some embodiments of the present disclosure.

FIG. 5 is a block flow diagram illustrating an example data processing workflow 500 involved in generating the template information, in accordance with some embodiments of the present disclosure. The data processing workflow 500 includes one or more processing operations applied to data 505 generated by analytical instrument(s) 501 (e.g., the instrument(s) 105 of the example system 100 of FIG. 1). The operations of the example workflow 500 are shown as a sequence of operations unassociated from a particular instrument, computing device, or machine, as an approach to illustrate that multiple data types and/or data structures are generated at various points in the example workflow 500. Further, the example workflow 500 includes at least a subset of processing operations that are implemented in parallel, for example, by distributing operations over multiple computing devices (e.g., server(s) 120 of FIG. 1) and/or by processing the data 505 on a multi-core processor.

The data 505 can be or include image data (e.g., microscope image data 220 of FIG. 2), but can also include other data describing a sample (e.g., sample 215 of FIG. 2). For example, the data can be optical image data, generated using optical microscopes and/or cameras, spectral mapping image data, generated using spatially resolved spectrometry, force-microscopy data mapping electronic properties of a sample surface in two or more dimensions, or the like.

The data 505 can be distributed, in whole or in part, to one or more models 510, configured to detect features (e.g., features 225 and 230 of FIG. 2 and features 415 of FIG. 4) and/or groupings of features (e.g., clusters 410 of FIG. 4) in the data 505. As described in more detail in reference to FIG. 3, the data 505 can be segmented by one or more pre-processing operations, as an approach to improving parallelization, and model(s) 510 can be or include various types of image processing models and/or algorithms (e.g., CNN-type machine-learning models, patch-based processing algorithms, etc.). In this way, the output from model(s) 510 can be or include data 515 describing feature information, such as rank, location in the image data, and/or location in the sample. The data 515 output from the model(s) 510 can be combined to generate aggregated data 520 and provided to a template detection sub-process 530. As described in more detail in reference to FIG. 6, one or more template detection sub-processes 530 can be configured to map feature template data 405 to the output data 515 and/or aggregated data 520. In some cases, template detection sub-process 530 can be implemented as an algorithm configured to generate template information 535, as described in more detail in reference to FIG. 3.

The template information 535 can include template locations, ROI data, feature sequence data, such as feature multiplicity and order information observed in the sample, template instance information, or other data permitting the further interrogation of the sample by a user of the analytical system (e.g., example system 100 of FIG. 1) or by the instrument (e.g., when operating automatically and/or pseudo-automatically). The template information 535, in turn, can be provided as input to an outputting sub-process 540 that can be or include one or more algorithms for generating visualization data, sample positioning instructions, beam direction instructions, detector operating instructions, instrument operating parameters, or the like. In an illustrative example, the outputting sub-process 540 can generate instruction data 545 to guide the instrument 501 in generating additional data, based at least in part on the template(s) information 535 generated using the data 505.

Figure 6:
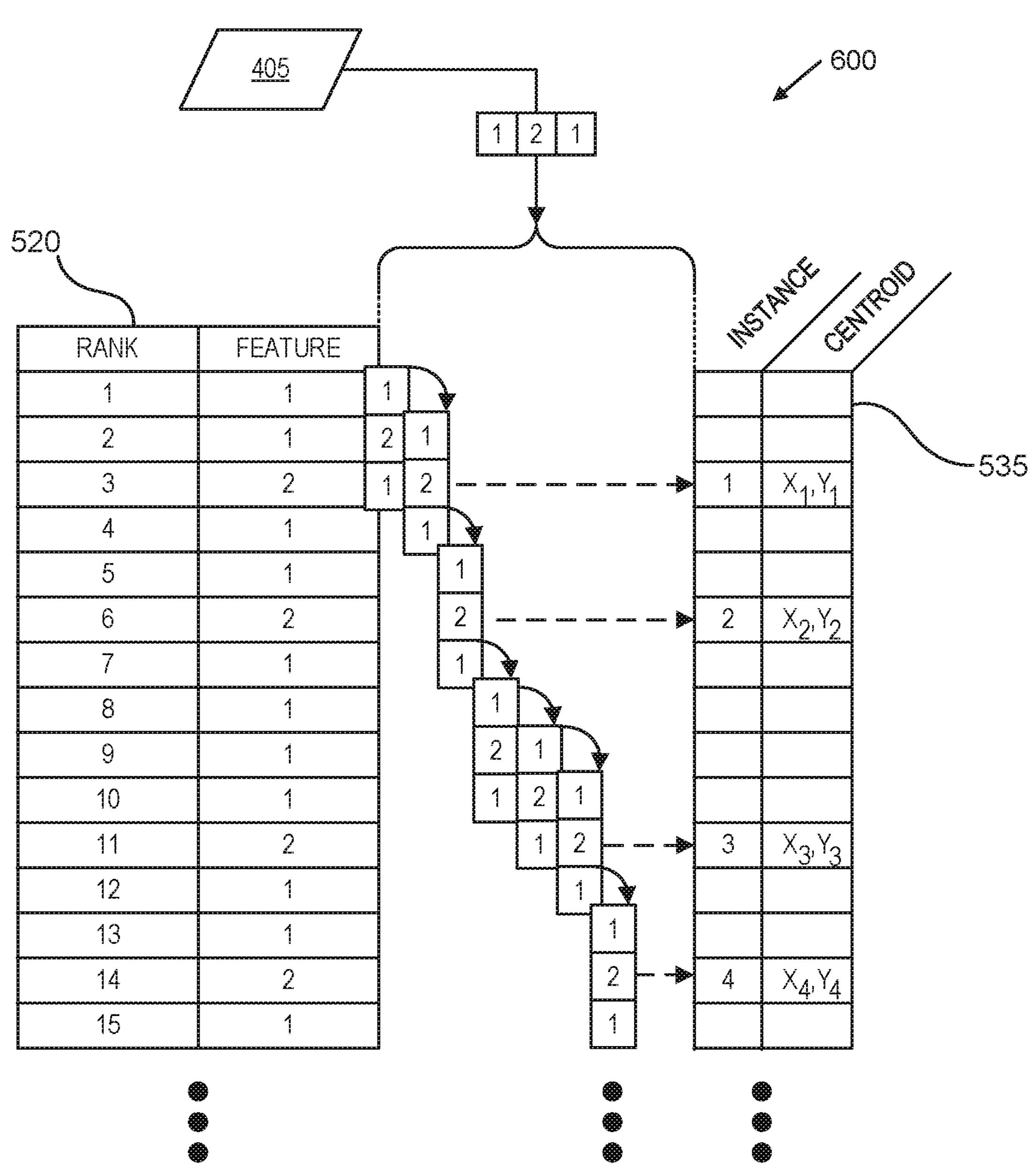
FIG. 6 is a schematic diagram illustrating an example convolution technique for generating the template information, in accordance with some embodiments of the present disclosure.

FIG. 6 is a schematic diagram illustrating an example convolution technique 600 for generating the template information, in accordance with some embodiments of the present disclosure. The example technique 600 includes mapping feature template data 405 onto output data 515 and/or aggregated data 520 describing feature rank and identity information for a device-line sample. In the example technique 600, the feature template data 405 describes a grouping (e.g., grouping 235 of FIG. 2) including a first instance of a first feature, followed by a first instance of a second feature, followed by a second instance of the first feature. The convolution approach includes mapping the feature template data 405 onto the sequence of features in the aggregated data 520 determining whether the features match the template, followed by incrementing the template by one rank if the features don't match the template, or by one template-length where the features do match the template. For one or more of the templates that are detected (e.g., each of the templates or fewer), an instance number can be attributed, as well as various location/position data referencing the template's relative position in the image data and/or on the sample. In FIG. 6, the data include centroid positions referencing an X-Y coordinate in the image or on the sample.

In some embodiments, additional and/or alternative techniques are used for mapping feature template data 405 to aggregated data 520, as part of generating feature information 535 for the sample. For example a technique for measuring an error or distance between the template and measured features (e.g., mean-square error) can be used to generate feature information 535. Similarly, template matching approaches can include outlier rejection (e.g., random sample consensus techniques) to improve matching in noisy data. Advantageously, template matching approaches can be extended to higher dimensions. Embodiments of the present disclosure include two-dimensional convolution (e.g., along a second axis in an array of features).

In the preceding description, various embodiments have been described. For purposes of explanation, specific configurations and details have been set forth in order to provide a thorough understanding of the embodiments. However, it will also be apparent to one skilled in the art that the embodiments may be practiced without the specific details. Furthermore, well-known features may have been omitted or simplified in order not to obscure the embodiment being described. While example embodiments described herein center on microscopy systems, and charged particle microscope systems in particular, these are meant as non-limiting, illustrative embodiments. Embodiments of the present disclosure are not limited to such embodiments, but rather are intended to address analytical instruments systems for which a wide array of material samples can be analyzed to determine chemical, biological, physical, structural, or other properties, among other aspects, including but not limited to material, chemical, physical, electronic structure, etc., trace element composition, or the like.

Some embodiments of the present disclosure include a system including one or more data processors and/or logic circuits. In some embodiments, the system includes a non-transitory computer-readable storage medium containing instructions, which, when executed on the one or more data processors and/or logic circuits, cause the one or more data processors and/or logic circuits to perform part or all of one or more methods and/or part or all of one or more processes and workflows disclosed herein. Some embodiments of the present disclosure include a computer-program product tangibly embodied in non-transitory machine-readable storage media, including instructions configured to cause one or more data processors and/or logic circuits to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the claims. Thus, it should be understood that although the present disclosure includes specific embodiments and optional features, modification and variation of the concepts herein disclosed may be resorted to by those skilled in the art, and that such modifications and variations are considered to be within the scope of the appended claims.

Where terms are used without explicit definition, it is understood that the ordinary meaning of the word is intended, unless a term carries a special and/or specific meaning in the field of charged particle microscopy systems or other relevant fields. The terms "about" or "substantially"

are used to indicate a deviation from the stated property within which the deviation has little to no influence of the corresponding function, property, or attribute of the structure being described. In an illustrated example, where a dimensional parameter is described as "substantially equal" to another dimensional parameter, the term "substantially" is intended to reflect that the two parameters being compared can be unequal within a tolerable limit, such as a fabrication tolerance or a confidence interval inherent to the operation of the system. Similarly, where a geometric parameter, such as an alignment or angular orientation, is described as "about" normal, "substantially" normal, or "substantially" parallel, the terms "about" or "substantially" are intended to reflect that the alignment or angular orientation can be different from the exact stated condition (e.g., not exactly normal) within a tolerable limit. For dimensional values, such as diameters, lengths, widths, or the like, the term "about" can be understood to describe a deviation from the stated value of up to ±10%. For example, a dimension of "about 10 mm" can describe a dimension from 9 mm to 11 mm.

The description provides exemplary embodiments, and is not intended to limit the scope, applicability or configuration of the disclosure. Rather, the ensuing description of the exemplary embodiments will provide those skilled in the art with an enabling description for implementing various embodiments. It is understood that various changes may be made in the function and arrangement of elements without departing from the spirit and scope as set forth in the appended claims. Specific details are given in the description to provide a thorough understanding of the embodiments. However, it will be understood that the embodiments may be practiced without these specific details. For example, specific system components, systems, processes, and other elements of the present disclosure may be shown in schematic diagram form or omitted from illustrations in order not to obscure the embodiments in unnecessary detail. In other instances, well-known circuits, processes, components, structures, and/or techniques may be shown without unnecessary detail.

What is claimed is:

1. A computer-implemented method, comprising:

receiving microscope image data;

detecting a feature in the microscope image data;

receiving feature template data describing a grouping of features including the feature, the feature template data comprising feature multiplicity information and feature order information;

detecting the grouping in the microscope image data based at least in part on the feature template data;

generating template information describing the grouping; and outputting the template information.

2. The computer-implemented method of claim 1, wherein detecting the feature in the microscope image data comprises:

inputting at least a portion of the microscope image data to a model configured to detect the feature; and generating, as an output of the model, coordinate information describing a location of the feature in the microscope image data.

3. The computer-implemented method of claim 2, wherein the location of the feature corresponds to a set of coordinates for a centroid of the feature.

4. The computer-implemented method of claim 2, wherein the model comprises a convolutional neural network trained to input the portion of the microscope image data and to output the coordinate information.

5. The computer-implemented method of claim 2, wherein the feature is a first feature, the model is a first model, the portion is a first portion, the coordinate information is first coordinate information, and the location is a first location, and wherein the microscope image data includes a second feature, the method further comprising:

inputting at least a second portion of the microscope image data to a second model configured to detect the second feature; and generating, as an output of the second model, second coordinate information describing a second location of the second feature in the microscope image data.

6. The computer-implemented method of claim 2, wherein the feature is a first feature, wherein the feature template data describes a sequence of multiple features including the first feature, and wherein detecting the grouping comprises:

convolving the feature template data with the coordinate information; and detecting an instance of the grouping in the microscope image data based at least in part on the location of the feature relative to at least a subset of the multiple features in the sequence.

7. The computer-implemented method of claim 6, wherein the detecting the instance of the grouping comprises:

determining a first rank of the first feature in the sequence; and determining that the first rank of the first feature and a second rank of a second feature in the sequence match the feature template data.

8. The computer-implemented method of claim 1, wherein detecting the grouping in the image data comprises detecting an instance of the grouping having an inverse feature order.

9. The computer-implemented method of claim 1, wherein the feature forms at least part of a device in an integrated circuit.

10. The computer-implemented method of claim 1, wherein the microscope image data comprises an image generated by a charged particle microscope.

11. The computer-implemented method of claim 10, wherein the microscope image data further comprises coordinate metadata mapping a pixel of the image data to a position on a sample.

12. The computer-implemented method of claim 1, wherein outputting the template information comprises sending the template information to a charged particle microscope, the charged particle microscope being configured to generate image data based at least in part on the template information.

13. The computer-implemented method of claim 1, wherein the template information comprises a location of the grouping in the microscope image data.

14. The computer-implemented method of claim 13, wherein the location of the grouping corresponds to a vertex of a bounding box circumscribing the grouping.

15. One or more non-transitory machine-readable media, storing instructions that, when executed by a machine, cause the machine to perform operations comprising:

receiving microscope image data;

detecting a feature in the microscope image data;

receiving feature template data describing a grouping of features including the feature, the feature template data comprising feature multiplicity information and feature order information;

detecting the grouping in the microscope image data based at least in part on the feature template data;

generating template information describing the grouping; and outputting the template information.

16. The media of claim 15, wherein detecting the feature in the microscope image data comprises:

inputting at least a portion of the microscope image data to a model configured to detect the feature; and generating, as an output of the model, coordinate information describing a location of the feature in the microscope image data.

17. The media of claim 16, wherein the feature is a first feature, the model is a first model, the portion is a first portion, the coordinate information is first coordinate information, and the location is a first location, and wherein the microscope image data includes a second feature, the operations further comprising:

inputting at least a second portion of the microscope image data to a second model configured to detect the second feature; and generating, as an output of the second model, second coordinate information describing a second location of the second feature in the microscope image data.

18. The media of claim 15, wherein outputting the template information comprises sending the template information to a charged particle microscope, the charged particle microscope being configured to generate image data based at least in part on the template information.

19. The media of claim 16, wherein the feature is a first feature, wherein the feature template data describes a sequence of multiple features including the first feature, and wherein detecting the grouping comprises:

convolving the feature template data with the coordinate information; and detecting an instance of the grouping in the microscope image data based at least in part on the location of the feature relative to at least a subset of the multiple features in the sequence.

20. A computer-implemented method, comprising:

receiving microscope image data;

detecting a feature in the microscope image data;

receiving feature template data describing a grouping of features including the feature, the grouping corresponding to a sequence of features arranged in an order of respective position;

detecting the grouping in the microscope image data based at least in part on the feature template data;

generating template information describing the grouping; and outputting the template information.

* * * * *